United States Patent
Zaneti et al.

(10) Patent No.: US 11,021,175 B2
(45) Date of Patent: Jun. 1, 2021

(54) END UNDERFRAME FOR A RAILWAY VEHICLE MADE OUT OF COLD ROLLED AUSTENITIC STAINLESS STEEL AND CORRESPONDING PRODUCTION METHOD

(71) Applicant: ALSTOM TRANSPORT TECHNOLOGIES, Saint-Ouen (FR)

(72) Inventors: Rafael Zaneti, Atibaia (BR); Felipe Czank, São Paulo (BR); Levi Albuquerqe, São Paulo (BR); Luiz Cano, São Paulo (BR); Eduardo Nascimento, São Paulo (BR); Marco Ficoni, São Paulo (BR); Marina Saito, São Paulo (BR); Andre Gouveia, São Paulo (BR); Andre Rocha, São Paulo (BR); Carlos Moraes, São Paulo (BR)

(73) Assignee: ALSTOM TRANSPORT TECHNOLOGIES, Saint-Ouen (FR)

( * ) Notice: Subject to any disclaimer, the term of this patent is extended or adjusted under 35 U.S.C. 154(b) by 251 days.

(21) Appl. No.: 15/992,911

(22) Filed: May 30, 2018

(65) Prior Publication Data

US 2018/0345999 A1 Dec. 6, 2018

(30) Foreign Application Priority Data

May 30, 2017 (BR) ...................... 10 2017 012202-6

(51) Int. Cl.
*B61F 1/10* (2006.01)
*B23K 9/00* (2006.01)
*B23K 9/007* (2006.01)
*B23K 103/04* (2006.01)
*B23K 101/00* (2006.01)
*B61D 17/04* (2006.01)

(52) U.S. Cl.
CPC ................ *B61F 1/10* (2013.01); *B23K 9/007* (2013.01); *B23K 9/0026* (2013.01); *B23K 2101/006* (2018.08); *B23K 2103/05* (2018.08); *B61D 17/04* (2013.01)

(58) Field of Classification Search
CPC ...... B61F 1/00; B61F 1/02; B61F 1/08; B61F 1/10; B61F 1/12; B61F 1/14; B61D 1/00; B61D 17/00; B61D 17/04; B61D 17/041
See application file for complete search history.

(56) References Cited

U.S. PATENT DOCUMENTS 2,504,112 A * 4/1950 Dean ......................... B61F 1/10
105/414
2,565,678 A * 8/1951 Dean .................... B61D 17/043
105/397

FOREIGN PATENT DOCUMENTS

GB 637294 A 5/1950
GB 641348 A 8/1950

* cited by examiner

*Primary Examiner* — Robert J McCarry, Jr.
(74) *Attorney, Agent, or Firm* — Troutman Pepper Hamilton Sanders LLP

(57) ABSTRACT

An end underframe comprises a headstock assembly and a bolster assembly and is made out of a single material which consists of cold rolled austenitic stainless steel.

13 Claims, 4 Drawing Sheets

END UNDERFRAME FOR A RAILWAY VEHICLE MADE OUT OF COLD ROLLED AUSTENITIC STAINLESS STEEL AND CORRESPONDING PRODUCTION METHOD

CROSS-REFERENCE TO RELATED APPLICATIONS

The present application claims priority from Brazilian Patent Application No. BR 10 2017 012202-6 filed May 30, 2017. The entire contents of which are incorporated herein by reference.

FIELD OF THE INVENTION

The present invention concerns an end underframe for a railway vehicle, of the type comprising a headstock assembly and a bolster assembly. The invention further concerns a production method for producing such an end underframe, a railway vehicle comprising such an end underframe, and a production method for producing such a railway vehicle.

BACKGROUND

End underframes for railway vehicles are known. Said end underframes form one of the main components of the car shells. They usually have two main components: the bolster assembly and headstock assembly. The headstock assembly is intended to sustain the loads coming from the coupler and also from the anti-climber. The bolster assembly is designed for resisting to the loads coming from the interface with the bogie, such as the vertical loads located at the air spring locations, the damper and anti-roll bars loads and also the accidental load at the central pivot. The bolster assembly operates in a high dynamic environment and the design for fatigue is of primary importance.

One of the alternatives for railway cars material is austenitic stainless steel, with the application of cold rolling degrees. The Life Cycle Cost of this material is usually lower than that of alternative materials.

Whereas it is common to use cold rolled austenitic stainless steel for the rest of the underframe, as shown by U.S. Pat. No. 2,565,678, end underframes are usually made out of carbon steel. Cold rolled austenitic stainless steel is not employed because of the cost of this material and of the difficulties met to provide with such a material an end underframe that would sustain the static and fatigue loads to which it is subjected.

Yet, having the end underframe made out of carbon steel leads to a lot of consequences. First, to avoid contamination of carbon steel on the austenitic stainless steel, the fabrication of the carbon steel end underframe requires a completely segregated area, which implies a station completely separated from those with austenitic stainless steel or an external supplier. Second it is necessary to paint it to prevent the end underframe from corroding. Another issue is that due to the thicker plates, all the welded joints need to be done by arc welding, inducing important distortion in the final assembly which needs machining to guarantee a proper surface levelling at some locations, such as the air spring location or the bolted connections.

SUMMARY

The invention therefore aims at simplifying the fabrication method of the underframe, preferably by avoiding segregating the fabrication of the end underframe, avoiding painting of the end underframe, and avoiding machining of the assembled parts. Other objectives of the invention consist in lightening the end underframe and reducing its cost To that end, the invention consists, along a first aspect, in an end underframe of the type mentioned above, wherein said end underframe is made out of a single material which consists of cold rolled austenitic stainless steel.

According to particular embodiments of the invention, the end underframe further comprises one or several of the following features, considered alone or along any technically feasible combination of features:
- the end underframe comprises several pieces assembled together by spot welding;
- some parts of the end underframe are assembled together by arc welding;
- the headstock assembly and the bolster assembly are connected together by bolts;

The invention further consists, along a second aspect, in a railroad car comprising an end underframe as defined above.

The invention also consists, along a third aspect, in a production method for producing an end underframe for a railway vehicle, said underframe comprising a headstock assembly and a bolster assembly, wherein said method comprises the steps of:
- providing pieces made out of a single material, said material consisting of cold rolled austenitic stainless steel, and
- assembling said pieces together so that the end underframe is obtained.

According to particular embodiments of the invention, the production method further comprises one or several of the following features, considered alone or along any technically feasible combination of features:
- the assembling step comprises spot welding some of the pieces together;
- the assembling step comprises arc welding some of the pieces together;
- the assembling step comprises the following sub steps:
  assembling a first part of the pieces together so that the headstock assembly is formed,
  assembling a second part of the pieces together so that the bolster assembly is formed, and
  assembling the headstock assembly to the bolster assembly.

The invention furthermore consists, along a fourth aspect, in a production method for producing a railroad car, comprising a step of producing an end underframe of said railroad car, wherein said step consists of the production method as defined above.

BRIEF DESCRIPTION OF THE DRAWINGS

Other features and advantages of the invention will become more apparent by reading the following description, given only as an example and made with reference to the attached drawings, wherein.

DETAILED DESCRIPTION

In the following, the orientation terms are defined with reference to the usual orthogonal coordinate system of the railway vehicles, shown in the Figures, and in which we distinguish:
- a longitudinal axis X, oriented from the rear toward the front,
- a transversal axis Y, oriented from the right toward the left and defining with the longitudinal axis X a horizontal plane, and
- a vertical axis Z, oriented from bottom to top, said vertical axis Z defining with the longitudinal axis X a longitudinal plane and with the transversal axis Y a transversal plane.

Figure 1:
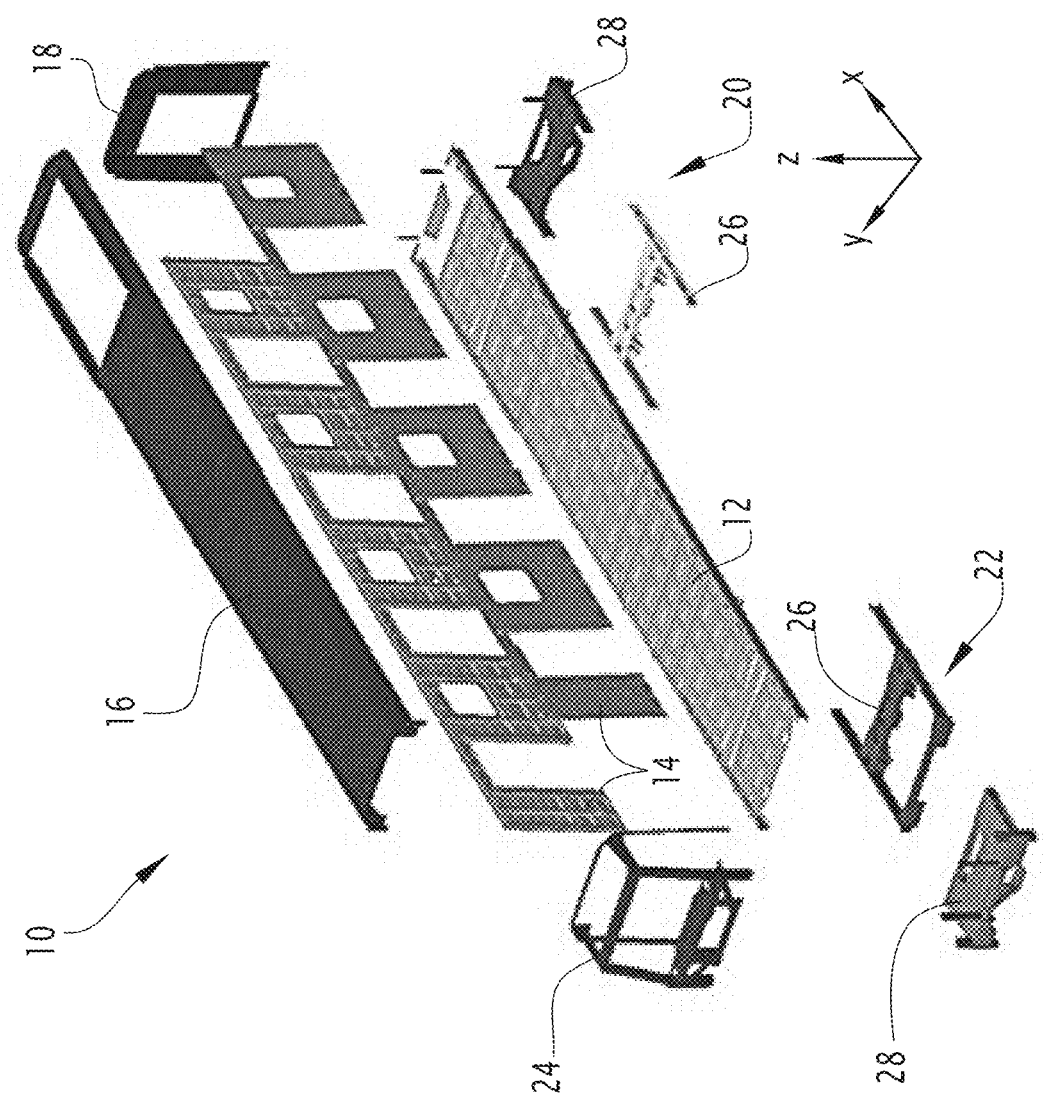
FIG. 1 is an exploded view of a railroad car according to the invention.

The railroad car 10 shown in FIG. 1 comprises, in a known manner, an underframe 12, two side frames 14 protruding from the underframe 12 and extending longitudinally, a roof 16 connecting the side frames 14 opposite the underframe 12 and, at least one longitudinal end thereof, an end frame 18 extending transversally, said end frame 18 defining a longitudinal pathway through it. The railroad car 10 further comprises, added to the underframe 12, a first end underframe 20 at a first longitudinal end thereof, and a second end underframe 22 at a second longitudinal end thereof.

In the shown example, the railroad car 10 is intended to constitute an end car of a railway vehicle and therefore comprises a cabin 24 at a longitudinal end thereof. In alternative (not shown), the railroad car 10 is intended to be positioned between two other cars of a railway vehicle and therefore comprises an end frame 18 at each one of its longitudinal ends.

Each one of the end underframes 20, 22 comprises a bolster assembly 26 and a headstock assembly 28. The headstock assembly 28 and the bolster assembly 26 are connected together by bolts.

Figure 2:
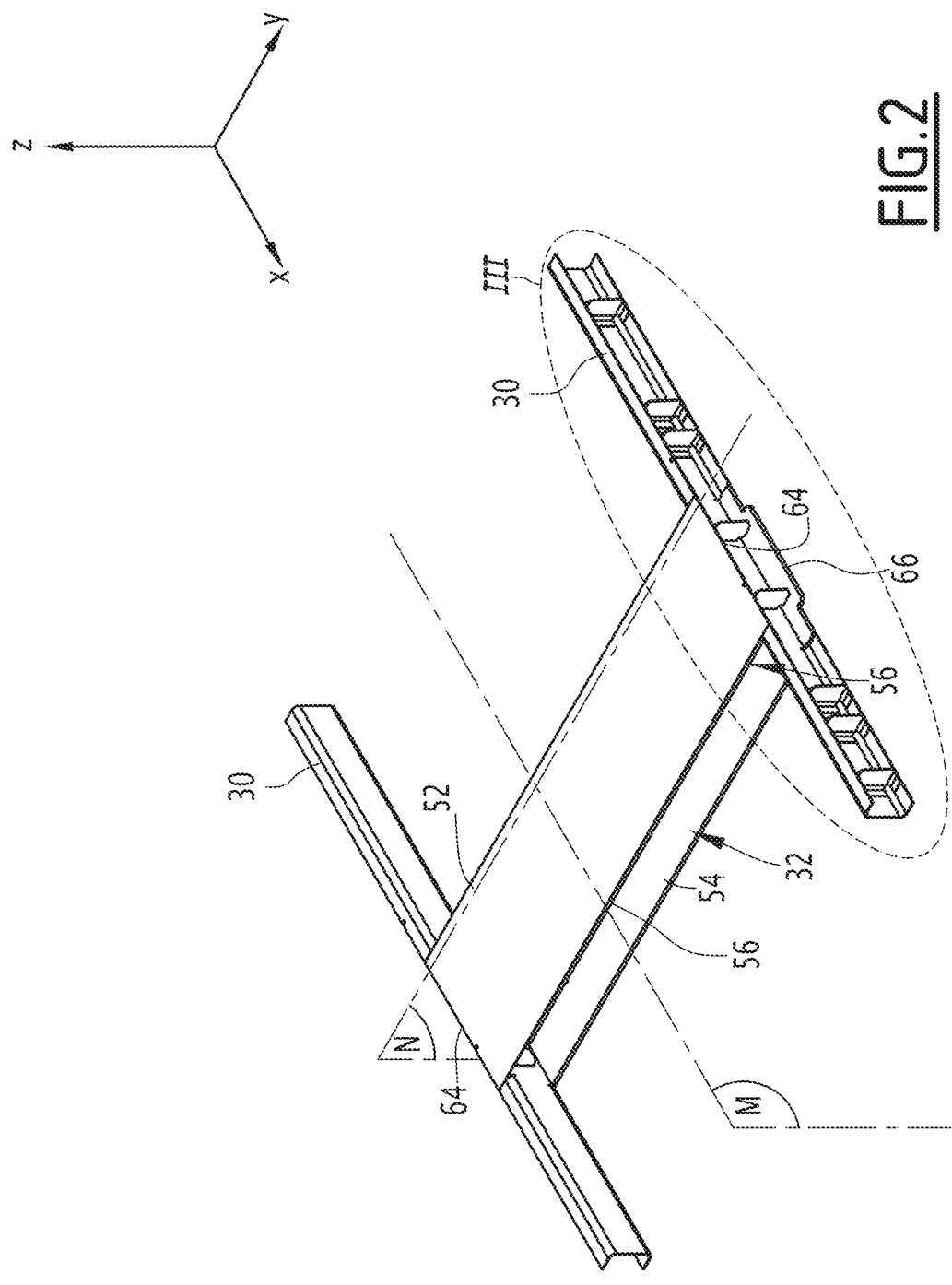
FIG. 2 is a three-quarter perspective front view from above of a bolster assembly of the railroad car of FIG. 1.

With reference to FIG. 2, the bolster assembly 26 comprises two longitudinal beams 30 facing each other and a transversal bridge 32 connecting the beams 30 to each other. The bolster assembly 26 is substantially symmetrical relatively to a longitudinal median plan M thereof. It is also substantially symmetrical relatively to a transversal median plan N thereof.

Figure 3:
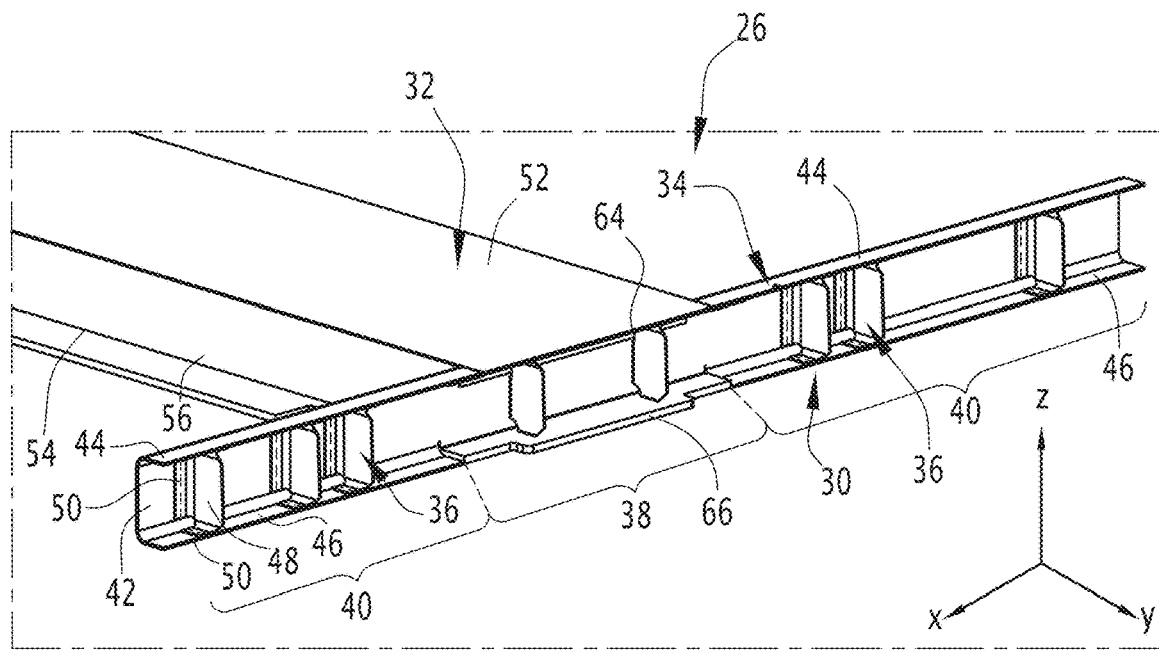
FIG. 3 is a three-quarter perspective front view from above of a detail marked III of the bolster assembly of FIG. 2.

With reference to FIG. 3, each longitudinal beam 30 of the bolster assembly 26 comprises a body 34 and a plurality of reinforcements 36 housed in the body 34.

The body 34 consists of a bent metal plate divided in a central section 38 and two end sections 40 positioned longitudinally on either side of the central section 38. The bent metal plate comprises a vertically extending plane portion 42 extending through the three sections 38, 40. The bent metal plate further comprises, in the end sections 40 only, an upper flange 44 and a lower flange 46 protruding toward the exterior of the bolster assembly 26 or, in other words, opposite to the bridge 32, respectively from an upper and from a lower edge of the plane portion 42, said flanges 44, 46 being substantially perpendicular to the plan portion 42. The bent metal plate thus has, in the end sections 40, a C-shaped transversal cross-section opening toward the exterior of the bolster assembly 26.

The reinforcements 36 are positioned in the end sections 40. Each one consists of a bent metal plate having a plane body 48 which is substantially rectangular and, protruding from three edges of the body 48, substantially perpendicularly to said body 48, toward the same direction, three flanges 50 (only two of them being visible on FIG. 3). Each one of these flanges 50 adjoins the body 34 of the beam 30 and is spot-welded to said body 34, as shown by the dotted line (similar dotted lines are also used in the Figures to illustrate other cases of spot-welding that will be mentioned in the following description). In particular, one of said flanges 50 is spot-welded to the plan portion 42, another one is spot-welded to the upper flange 44, and the third one is spot-welded to the lower flange 46.

Returning to FIG. 2, the bridge 32 comprises an upper plate 52 forming a cover of said bridge 32, a lower structure 54, and plates 56 joining the upper plate 52 and the lower structure 54.

The upper plate 52 is substantially plane. It extends over the central section 38 of both longitudinal beams 30, along the entire length of said central section 38, so that a lateral edge 64 of the upper plate 52 is flush with a free edge of the upper flange 44 of the body 34 of the beam 30.

The lower structure 54 extends below the central section 38 of each longitudinal beam 30, along the entire length of said central section 38, so that a lateral edge 66 of the lower structure 54 is flush with a free edge of the lower flange 46 of the body 34 of the beam 30.

The central section 38 of each longitudinal beam 30 is thus vertically sandwiched between the upper plate 52 and the lower structure 54 of the bridge 32.

The lower structure 54 is filet arc-welded to a lower edge of the plane portion 42 of the body 34 of the beam 30, in the central section 38 thereof.

The upper plate 52 and the beam 30 are connected together using a bent plate with a substantially L-shaped transversal cross-section (not visible). The bent plate comprises two flat panels which are positioned substantially perpendicular to each other, including a horizontal flat panel and a vertical flat panel.

The horizontal flat panel adjoins the upper plane 52 and the vertical flat panel adjoins the plane portion 42 of the body 34 of the beam 30. The vertical and the horizontal flat panels are, for example, spot-welded to the upper plane 52 or the beam 30.

In the embodiment shown in FIG. 1, the bolster assembly 26 of the rear end underframe 22 further comprises a bolted flange extending from one longitudinal beam 30 to the other at respective free ends of the longitudinal beams 30.

The bolted flange is, for example, used for the later assembly of the bolster assembly 26 with the cabin 24.

Figure 4:
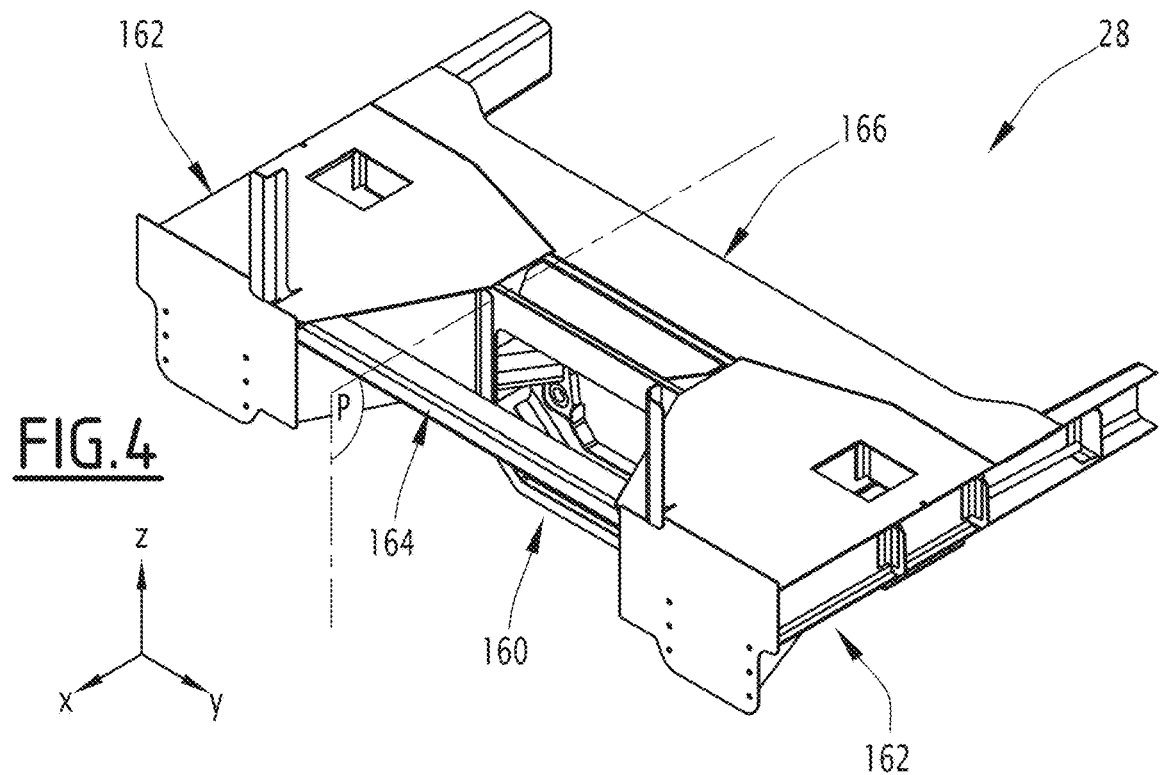
FIG. 4 is a three-quarter perspective front view from above of a headstock assembly of the railroad car of FIG. 1.

Turning now to FIG. 4, the headstock assembly 28 comprises a central coupler region 160, two buffer regions 162 positioned laterally on the sides of the coupler region 160, a cross-beam 164 extending from one buffer region 162 to the other, and a rear structure 166. The headstock assembly 28 is substantially symmetrical relatively to a longitudinal median plan P thereof.

Figure 5:
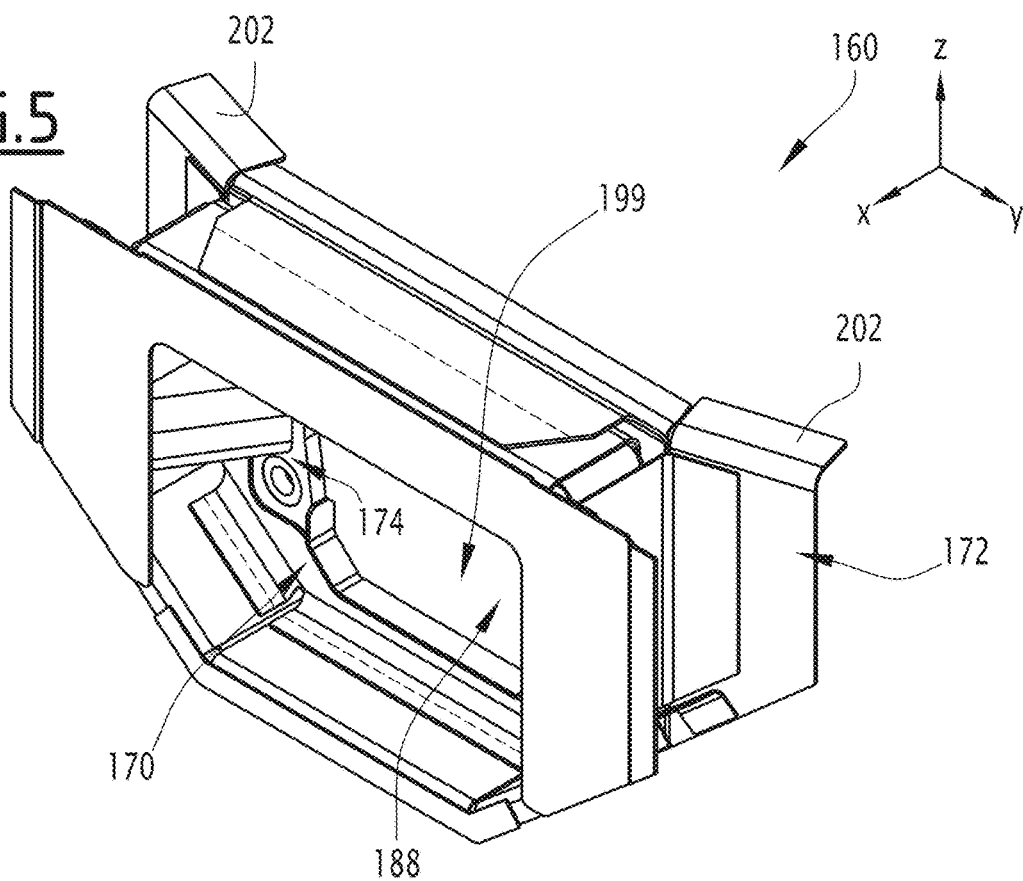
FIG. 5 is a three-quarter perspective front view from above of a coupler region of the headstock assembly of FIG. 4.

With reference to FIG. 5, the coupler region 160 comprises a front main plate 170 and a rear main plate 172 sandwiching together two solid pieces 174.

Each of the front and rear main plates 170, 172 is substantially symmetrical relatively to the longitudinal median plane P, and each solid piece 174 is substantially symmetrical to the other solid piece 174 relatively to the longitudinal median plane P.

The front main plate 170 consists of a bent plate.

The front main plate 170 has a through-hole 188 formed therein, said through-hole 188 opening in both a front face and a rear face of the front main plate 170 and having a transversal cross-section greater than 50% of the surface of the front main plate 170.

The rear main plate 172 has the same features as the front main plate 170, including a through-hole 199 formed therein.

The holes 188, 199 are longitudinally aligned with each other and define together a passage through the coupler region 160.

The solid pieces 174 are positioned on lateral sides of the holes 188, 199 formed in the front and rear main plates 170, 172.

All elements composing the coupler region 160, are made out of a single material, said material consisting of cold rolled austenitic stainless steel.

Figure 6:
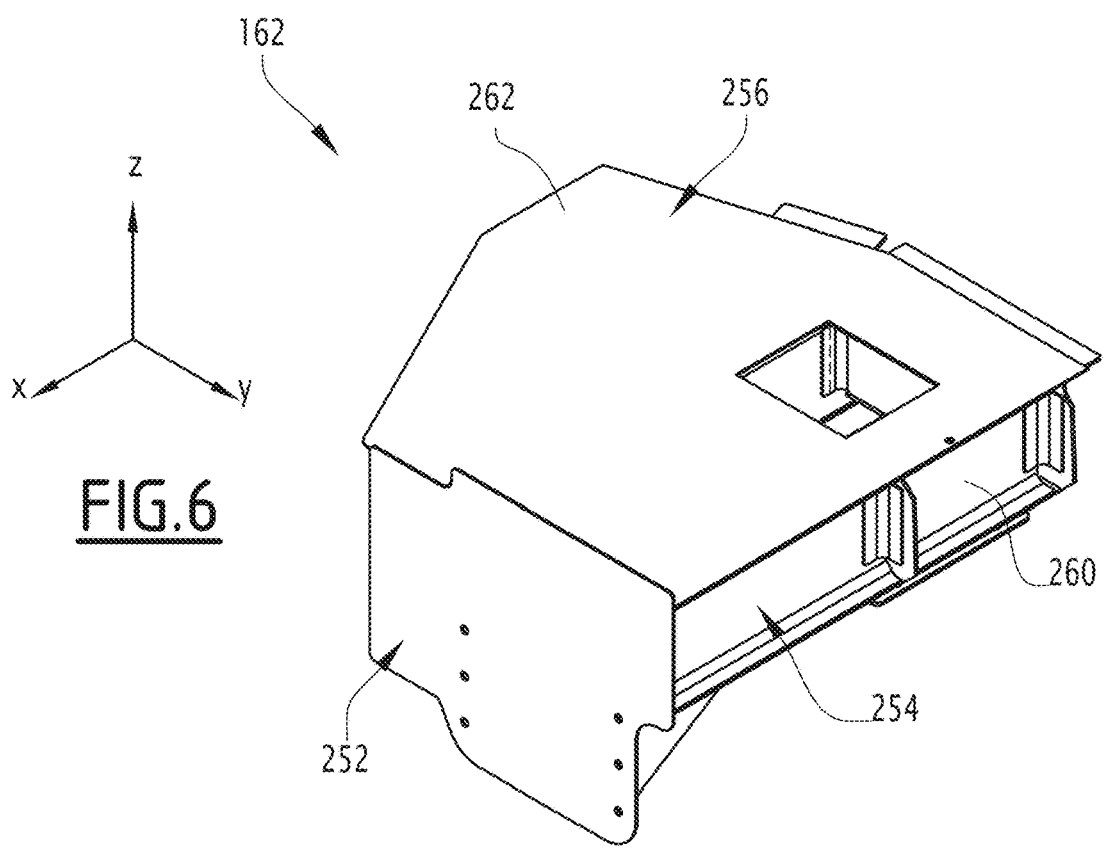
FIG. 6 is a three-quarter perspective front view from above of a buffer region of the headstock assembly of FIG. 4.

Turning now to FIG. 6, each buffer region 162 comprises a front plate 252, a lateral external plate 254 and an upper plate 256.

Each buffer region 162 further comprises a strengthening internal structure (not visible). The strengthening internal structure for example comprises ribs.

The front plate 252 is substantially planar and extends in a transversal plane.

The lateral external plate 254 comprises a body 260 which is substantially planar extends substantially in a longitudinal plane and has a substantially rectangular shape.

The lateral external plate 254 also comprises an upper flange (not shown) which adjoins the upper plate 256 and is in particular spot-welded to said upper plate 256.

The lateral external plate 254 further comprises a front flange (not shown) which adjoins a rear face of the front plate 252 and is in particular spot-welded to said rear face.

The upper plate 256 comprises a body 262 which is substantially planar and extends generally in a horizontal plane.

The body 262 rests on a respective side upper flange 202 (FIG. 5) of the rear main plate 172 of the coupler region 160 and is in particular spot-welded to said respective side upper flange 202.

The upper plate 256, further comprises a front flange (not shown) which adjoins the rear face of the front plate 252 and is in particular spot-welded to said rear face.

All elements composing the buffer region 162, comprising the front plate 252, the lateral external plate 254 and the upper plate 256, are made out of a single material, said material consisting of cold rolled austenitic stainless steel.

All elements composing the cross-beam 164 are made out of a single material, said material consisting of cold rolled austenitic stainless steel.

The crossbeam 164 has two ends. Each end is filet arc-welded to a respective one of the buffer regions 162.

The rear structure 166 is substantially symmetrical relatively to the longitudinal median plane P.

The rear structure 166 is spot-welded and/or filet arc welded to each buffer region 162 and to the coupler region 160.

The rear structure 166 extends along the whole buffer regions 162 and coupler region 160 along the transversal direction Y.

The rear structure 166 notably permits to give strength to the headstock 28 in order to resist the compression and tension loads.

All elements composing the rear structure 166 are made out of a single material, said material consisting of cold rolled austenitic stainless steel.

Thus, all elements composing the headstock assembly 28 are made out of a single material, said material consisting of cold rolled austenitic stainless steel. Since it is also the case for the elements composing the bolster assembly 26, each end underframe 20, 22 is therefore made out of a single material which consists of cold rolled austenitic stainless steel.

A production method for producing the railroad car 10 will now be described, with reference to the drawings.

First, the bolster assembly 26 and the headstock assembly 28 of each end underframe 20, 22 are assembled separately. To that end, the several pieces composing these assemblies 26, 28 are produced and then assembled by either filet arc-welding or by spot-welding, depending on the indications mentioned above.

This assembly step is carried out in the same workshop as the workshop in which the other structural parts of the railroad car 10, such as the underframe 12, the side frames 14, the roof 16, the or each end frame 18 and, if applicable, the cabin 24, are produced.

Then, each headstock 28 is assembled with an end frame 18 or with a cabin 24 and each bolster assembly 26 is assembled with the underframe 12.

In a next step, the headstock 28 and the bolster assembly 26 of each end underframe 20, 22 are assembled together, for instance by bolting together respective flanges. Then, the side frames 14 and the roof 16 are added.

The railroad car 10 is thus obtained.

Alternatively, each bolster assembly 26 is assembled with a respective headstock assembly 28 to form the end underframes 20, 22. In a next step, the end underframes 20, 22 are assembled to the underframe 12, the side frames 14, the roof 16, the or each end frame 18 and, if applicable, the cabin 24.

The railroad car 10 is thus obtained.

Thanks to the invention described above, it is therefore possible to produce the end underframe in the same workshop as the other structural parts of the railroad vehicle 10; as a consequence, the fabrication method of the railroad car 10 is significantly simplified.

Furthermore, using cold rolled austenitic stainless steel allows weight reduction of the end underframes 20, 22, since thinner plates can be used, and avoids painting of the end underframes 20, 22 for corrosion resistance.

In addition, by using only spot-welding and filet arc-welding, energy consumption is reduced and distortion of the assemblies caused by welding is minimized.

The invention claimed is:

1. An end underframe for a railway vehicle, comprising a headstock assembly and a bolster assembly, wherein that said end underframe is made out of a single material which consists of cold rolled austenitic stainless steel, wherein the headstock assembly comprises a central coupler region, two buffer regions positioned laterally on sides of the coupler region, a cross-beam extending from one buffer region to the other, and a rear structure, the coupler region comprising a front main plate and a rear main plate sandwiching together two solid pieces, the front main plate consisting of a bent plate, and having a through-hole opening formed therein, said through-hole opening formed in both a front face and a rear face of the front main plate and having a transversal cross-section greater than 50% of a surface of the front main plate.

2. The end underframe of claim 1, wherein the headstock assembly and the bolster assembly are connected together by bolts.

3. A railroad car comprising the end underframe of claim 1.

4. The end underframe of claim 1, wherein the rear main plate has a through-hole opening formed therein, the through-hole opening of the rear main plate formed in both a front face and a rear face of the rear main plate and having a transversal cross-section greater than 50% of the surface of the rear main plate.

5. The end underframe of claim 4, wherein the through-hole openings are longitudinally aligned with each other and define together a passage through the coupler region.

6. The end underframe of claim 5, wherein the solid pieces are positioned on lateral sides of the through-hole openings formed in the front and rear main plates.

7. The end underframe of claim 1, wherein each buffer region comprises a front plate, a lateral external plate and an upper plate.

8. The end underframe of claim 7, wherein the front plate is planar and extends in a transversal plane.

9. The end underframe of claim 7, wherein the lateral external plate comprises a body which is planar, the body extending in a longitudinal plane and having a rectangular shape.

10. The end underframe of any one of claim 7, wherein the upper plate comprises a body which is planar and extends generally in a horizontal plane, the body resting on a respective side upper flange of the rear main plate of the coupler region.

11. The end underframe of any one of claim 1, wherein the headstock assembly is symmetrical relatively to a longitudinal median plan thereof.

12. A production method for producing an end underframe for a railway vehicle, said end underframe comprising a headstock assembly and a bolster assembly, wherein said production method comprises the steps of:
providing pieces made out of a single material, said material consisting of cold rolled austenitic stainless steel, and
assembling said pieces together so that the end underframe is obtained,
wherein the headstock assembly comprises a central coupler region, two buffer regions positioned laterally on sides of the coupler region, a cross-beam extending from one buffer region to the other, and a rear structure,
the coupler region comprising a front main plate and a rear main plate sandwiching together two solid pieces,
the front main plate consisting of a bent plate, and having a through-hole opening formed therein, said through-hole opening formed in both a front face and a rear face of the front main plate and having a transversal cross-section greater than 50% of a surface of the front main plate.

13. A production method for producing a railroad car, comprising a step of producing an end underframe of said railroad car, wherein said step consists of the production method of claim 12.

* * * * *